United States Patent
Hung (10) Patent No.: US 9,125,129 B2
(45) Date of Patent: Sep. 1, 2015

(54) MOBILE COMMUNICATION DEVICE AND ASSOCIATED CONTROL METHOD

(71) Applicant: MStar Semiconductor, Inc., Hsinchu Hsien (TW)

(72) Inventor: Han-Sheng Hung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 66 days.

(21) Appl. No.: 14/048,136

(22) Filed: Oct. 8, 2013

(65) Prior Publication Data

US 2014/0106755 A1    Apr. 17, 2014

(30) Foreign Application Priority Data

Oct. 11, 2012   (TW) .............................. 101137528 A (51) Int. Cl.
*H04W 36/00* (2009.01)
*H04W 36/30* (2009.01)

(52) U.S. Cl.
CPC .......... *H04W 36/30* (2013.01); *H04W 36/0083* (2013.01)

(58) Field of Classification Search
CPC ................................................... H04W 36/30
USPC ....................................................... 455/437
See application file for complete search history.

(56) References Cited

U.S. PATENT DOCUMENTS

| 6,064,890 | A | 5/2000 | Hirose et al. |
| 2006/0160539 | A1* | 7/2006 | Juan et al. ..................... 455/436 |
| 2008/0220784 | A1* | 9/2008 | Somasundaram et al. ..... 455/437 |
| 2012/0170552 | A1* | 7/2012 | Oprescu-Surcobe et al. 370/332 |

FOREIGN PATENT DOCUMENTS

| EP | 1107630 B1 | 5/2003 |
| TW | I269594 B | 12/2006 |

OTHER PUBLICATIONS

Taiwan Office Action dated Sep. 25, 2014, 8 pages.

* cited by examiner

*Primary Examiner* — Justin Lee
(74) *Attorney, Agent, or Firm* — Edell, Shapiro & Finnan, LLC (57) ABSTRACT

A mobile communication device for a wireless communication network includes an evaluation module, a determination module and an informing module. The evaluation module evaluates a connection ability between the mobile communication device and a plurality of base stations. The determination module determines whether a report is to be issued according to the connection ability and a customized rule different from a standard rule. The standard rule corresponds to a threshold of the connection ability defined by the wireless communication network. When a determination result of the determination module is yes, the informing module issues the report to the wireless communication network.

18 Claims, 3 Drawing Sheets

MOBILE COMMUNICATION DEVICE AND ASSOCIATED CONTROL METHOD

This application claims the benefit of Taiwan application Serial No. 101137528, filed Oct. 11, 2012, the subject matter of which is incorporated herein by reference.

BACKGROUND OF THE INVENTION

1. Field of the Invention

The invention relates in general to a wireless communication technique, and more particularly, to a technique for enhancing a connection maintaining ability of a mobile communication device.

2. Description of the Related Art

From function perspectives of mobile communication devices such as portable handsets, a connection ability is generally considered as a principal performance. That is, not only call quality at an adequate level needs ensured under all circumstances, but also a situation of a call disconnection caused by movements of a user is unacceptable. A call disconnection mostly occurs when a mobile communication device enters a region with weak base station signals or in a crossover region between two base stations.

Figure 1:
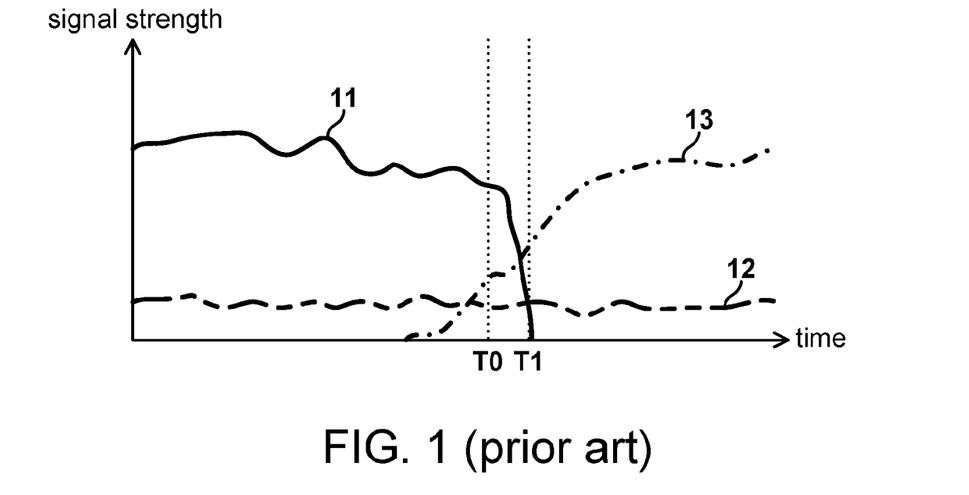
FIG. 1 shows an example of a call disconnection encountered by a mobile communication device.

FIG. 1 shows an example of a call disconnection encountered by a mobile communication device. In FIG. 1, the horizontal axis represents the time, and the vertical axis represents a signal strength (or a signal-to-noise ratio, SNR) of nearby base stations detected by the mobile communication device. In the example, base stations 11 to 13, all of a same wireless communication network, provide services to the mobile communication device. Before a time point T1, the call connection of the mobile communication device is provided by the base station 11. As a position of the mobile communication device changes or an obstruction between the mobile communication device and the base station 11 arises, the signal strength of the base station 11 drastically drops at the time point T1. Although the mobile communication device has detected the base station 13 having a preferred signal strength within the nearby region, since the mobile communication device is incapable of in time requesting the base station 13 for communication resource access rights of the base station 13 before the signal strength of the base station 11 drastically drops, an original ongoing call of the mobile communication device is nevertheless interrupted at the time point T1, leading to user disturbances.

Assume the mobile communication device is a mobile communication device compliant to a Universal Terrestrial Radio Access Network (UTRAN). Before the time point T1, the base station 11 is an active set base station that primarily provides the mobile communication device with connection services, whereas the base station 12 may be regarded as a monitor set base station of the mobile communication device as it has a weaker signal strength. Various types of events are defined in UTRAN specifications. Among the events, an event 1A is an event in which the mobile communication device detects that, the signal strength of a base station, previously categorized as a non-active set base station, has risen to a level that the base station ought to be included as an active set base station. Alternatively, the above situation is referred as, the base station has entered a reporting range of the mobile communication device. A threshold of the reporting range is associated with the signal strength of the base station having the strongest signal strength. An event B1 is an event in which, the mobile communication device detects that the signal strength of an active set base station has dropped out of the reporting range. Further, an event C1 represents that a measurement result of the mobile communication device shows an active set base station should be replaced by a monitor set base station.

Taking FIG. 1 for example, after detecting that the base station 13 has entered the reporting range, the mobile communication device is expected to issue a report to a system administrator to inform the system administrator of the occurrence of the event 1A. After receiving the report, the system administrator may then authorize communication resource access rights of the base station 13 to the mobile communication device if the base station 13 has idle resources. However, in the above example, it is to be reminded that, before reporting the event 1A to the system administrator, the mobile communication device has lost the connection ability and thus cannot in time include the base station 13 as its active set base station. On the hand, under such circumstances, the base station 12 categorized as a monitor set base station serves no meaningful purpose.

One solution for the above issues is to increase hardware standards of the mobile communication device (e.g., by enhancing sensitivity and anti-noise capabilities of circuits), so that the mobile communication device is given a more robust connection ability. With the reinforced connection ability, the mobile communication device becomes capable of transceiving data even in harsh communication environments to thus reduce disconnection possibilities. However, the above solution requires high hardware costs.

Further, current mobile communication devices are usually configured to passively receive resource configurations determined by a system administrator. Under certain circumstances, a mobile communication device may also encounter disconnections due to non-ideal configurations or designated periods of base station resources.

SUMMARY OF THE INVENTION

The invention is directed to a mobile communication device and an associated method. Through a customized rule instead of a standard rule specified by a wireless communication network, a time point for requesting the wireless communication network for resource access rights is determined. Therefore, the mobile communication device of the present invention is capable of significantly reducing possibilities of call disconnections caused by insufficient communication resources.

According to an embodiment of the present invention, a mobile communication device is provided. The mobile communication device, serviced by a wireless communication network, comprises an evaluation module, a determination module and a reporting module. The evaluation module evaluates a connection ability between the mobile communication device and a plurality of base stations. The determination module determines whether a report is to be issued according to the connection ability and a customized rule different from a standard rule. The standard rule corresponds to a threshold of the connection ability defined by the wireless communication device. The reporting module issues the report to the wireless communication network when the determination module determines the report is to be issued.

According to another embodiment of the present invention, a control method for a mobile communication device is provided. The mobile communication device is serviced by a wireless communication network. The control method comprises: evaluating a connection ability between the mobile communication device and a plurality of base stations; determining whether a report is to be issued according to the connection ability and a customized rule different from a standard rule, wherein the standard rule corresponds to a threshold of the connection ability defined by the wireless communication network; and issuing the report to the wireless communication network when a determination result of the determining step is yes.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
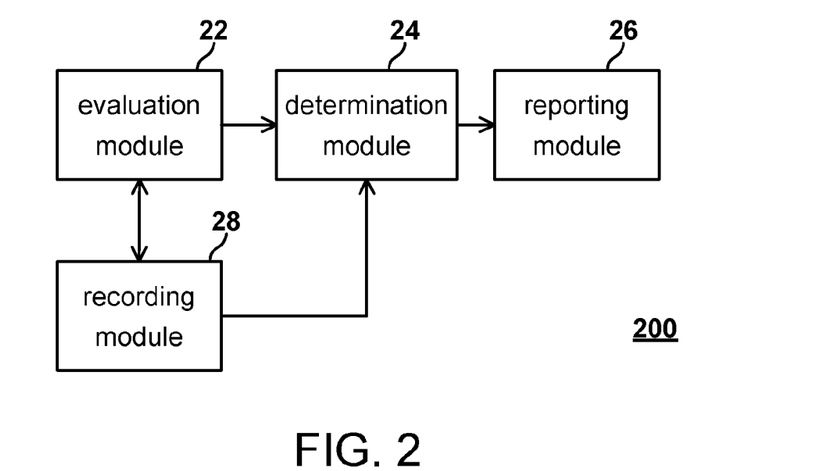
FIG. 2 shows a block diagram of a mobile communication device according to an embodiment of the present invention.

FIG. 2 shows a mobile communication device 200 according to an embodiment of the present invention. The mobile communication device 200 comprises an evaluation module 22, a determination module 24, a reporting module 26 and a recording module 28. In practice, the mobile communication device 200 may be an electronic device, such as a portable handset, a personal digital assistant, a laptop computer, a game console or a portable pad, capable of communicating with a wireless communication network. It should be noted that the recording module 28 is an optional component of the mobile communication device 200. In the descriptions below, the mobile communication device 200 serviced by a Universal Terrestrial Radio Access Network (UTRAN) is taken as an example for explaining embodiments of the present invention.

The evaluation module 22 continually or periodically evaluates connection ability of the mobile communication device 200 to each of base stations within a nearby region of the mobile communication device 200. For example, each of the base stations is designated as an active set base station or a monitor set base station of the mobile communication device 200, or neither of the above. An active set list and a monitor set list designated to the mobile communication device 200 are stored in the recording module 28 of the mobile communication device 200. Compared to the monitor set base stations, the active set base stations have greater connection ability, and are configured by a UTRAN system administrator for providing the mobile communication device 200 with connection services. In practice, the connection ability may be represented by a signal strength or an SNR each of the base stations detected by the mobile communication device 200.

Regarding connection ability report, various types of events are defined in UTRAN specifications. Upon detecting the occurrence of an event, the mobile communication device 200 is required to report the event to the UTRAN system administrator to facilitate the system manger to make corresponding adjustments on communication resource configurations. The UTRAN specifications clearly state default reporting thresholds for the various types of events. In the current UTRAN specifications, in order to reduce possibilities of call disconnections caused by insufficient communication resources, the determination module 24 in the mobile communication device 200 according to the embodiment of the present invention determines whether a report is to be issued on a particular event according to a customized rule (different from a standard rule defined by the UTRAN specifications). In the embodiment below, an example of determining whether to issue a report on an event 1A by the determination module 24 is first described.

Event 1A is an event in which a base station, originally not categorized as an active set base station of a mobile communication device, falls into a reporting range of the mobile communication device. Conventionally, a default threshold (to be referred to as a first standard threshold) of the event 1A is not a constant value. As regulated by the UTRAN specifications, the default first standard threshold equals to a result of subtraction of a signal strength index of an active set and a predetermined value provided by a system administrator. According to the UTRAN specifications, it is assumed that if quota of active set is not full (with an upper limit usually being four), when a mobile communication device detects that the connection ability of a base station originally not categorized in the active set becomes greater than the first standard threshold, a report on the event 1A needs to be issued, in order to request a UTRAN system administrator to add that base station into the active set base stations of the mobile communication device.

According to the embodiment of the present invention, the determination module 24 in the mobile communication device 200 evaluates whether the reporting module 26 needs to issue a report on the event 1A according to a first customized threshold different from the first standard threshold in the UTRAN specification. Assume that an active set list recorded in the recording module 28 originally contains only one base station (with a code 001), and the mobile communication device 200 evaluates that the first standard threshold is −12 dB according to the signal strength of the base station 001. For example, the determination module 24 sets the first customized threshold as −18 dB. When the evaluation module 22 detects that the connection ability of another base station (with a code 002) is greater than −18 dB, the determination module 24 determines that the reporting module 26 needs to issue a report on the event 1A to request the UTRAN system manger to add the base station 002 as an active set base station of the mobile communication device 200. That is to say, even when the base station 200 has not reached the standard of being included as an active set base station as regulated by the UTRAN specifications, the determination module 24 in the mobile communication device 200 according to the embodiment of the present invention is configured to determine that a report on the event 1A is to be issued, so as to request the UTRAN system administrator to add the base station 002 as an active set base station of the mobile communication device 200.

In other words, when the number (quantity) of the active set base stations has not reached the upper limit, the determination module 24 moderates the rule for issuing the report on the event 1A, which allows the mobile communication device 200 to acquire service resources from more base stations based as quickly as possible. Although the connection ability of the base station 002 may not be as good as that of the base station 001, the base station 002 provides a certain level of connection ability. In case the connection ability of base station 001 abruptly and drastically drops or even vanishes completely, being added as one of the active set base stations, the base station 002 is available for serving the mobile communication device 200, in a way that the connection of the mobile communication device 200 is prevented from a total disconnection. Under the support of the base station 002 as one of the active set base stations, the mobile communication device 200 may be able to move to a coverage range of another base station having a better connection ability.

For the event 1A, in one embodiment, the first customized threshold adopted by the determination module 24 is a constant value (e.g., the above value −18 dB). In practice, by setting the customized threshold as −18 dB for the event 1A, almost every base station having a connection ability as detected by the evaluation module 22 will be determined and included as an active set base station by the determination module 24. In an alternative embodiment, the first customized threshold is a variable value that changes with the first standard threshold (e.g., a value of the first standard threshold subtracted by 3 dB). In practice, without changing the equation specified in the UTRAN specifications for calculating the threshold of the event 1A, the mobile communication device 200 may replace a value originally provided by a UTRAN network end in the equation by one or more customized values, so as to generate the first customized threshold different from the first standard threshold. For example, assume the equation for calculating the first standard threshold $TH_{1A\_STANDARD}$ is $TH_{1A\_STANDARD}=M_{BEST}-R_{1A}$, where $M_{BEST}$ represents the signal strength of an active set base station having the strongest signal strength, and $R_{1A}$ represents a value provided by the UTRAN network end. The mobile communication device 200 may determine another value $R'_{1A}$ according to the value of $M_{BEST}$ and substitute $R'_{1A}$ for $R_{1A}$ into the equation, such that a calculation result (i.e., the first customized threshold) is equal to −18 dB at all times. In one embodiment, the mobile communication device 200 is designed as: 1) when $M_{BEST}$ is greater than −18 dB, determining the value $R'_{1A}$ according to $M_{BEST}$ to set the threshold of the event 1A to −18 dB; and 2) when $M_{BEST}$ is smaller than −18 dB, adopting the value $R_{1A}$ provided by the UTRAN network end to set the threshold of the event 1A to the first standard threshold. In other words, the determination module 24 may be designed to selectively adopt a customized rule or a standard rule.

When determining whether to issue the report on the event 1A, the determination module 24 may also consider the time as a determination basis. Assuming that, as regulated by a UTRAN system administrator, when the connection ability of a base station outside the active set is greater than the threshold of the event 1A for longer than a standard period (e.g., 200 ms), a mobile communication device is required to issue a report. In one embodiment, the determination module 24 is configured to determine the report is to be issued when the connection ability of a base station outside the active set is greater than a threshold of the event 1A for longer than a customized period (e.g., 60 ms), with the customized period being shorter than the standard period. Similarly, the determination module 24 may selectively loosen the rule for issuing a report on the event 1A to allow the mobile communication device 200 to more quickly acquire service resources favorable for current circumstances. In one embodiment, the above customized period may be adjustable, and the customized period may be shortened when one or more base stations in the active set list are determined as having poor connection ability. With the above approach, the mobile communication device 200 is similarly allowed to in advance request for and thus obtain preferred service resources when service quality of an active set base station is non-ideal.

In the UTRAN specifications, an event 1B represents an event in which the connection ability of a base station originally categorized as an active set base station has dropped into a reporting range, i.e., the connection ability has dropped to lower than a threshold (to be referred to a second standard threshold) of the event 1B. A report of the event 1B is to request the UTRAN system administrator to remove the base station from the active set list. According to the UTRAN specifications, regardless of the current number of active set base stations, a mobile communication device is required to issue a report on the event 1B when the connection ability of an active set base station drops to lower than the second standard threshold. At the mean time, according to the embodiment of the present invention, the determination module 24 in the mobile communication device 200 evaluates whether the reporting module 26 needs to issue a report on the event 1B according to a second customized threshold that is lower than the second standard threshold. That is, upon discovering that the connection ability of an active set base station is lower than the second customized threshold, the determination module 24 determines that the report on the event 1B needs to be issued.

The second customized threshold may be designed according to practical guidelines. In general, a signal when the connection ability is lower than −24 dB is considered an extremely weak signal. Accordingly, in one embodiment, the second customized threshold may be designed as an exceptionally low standard from actual measurement, such as −21 dB, so that the reporting module 26 almost does not issue report on the event 1B. Thus, in this embodiment, any base station having any level of connection ability detected by the evaluation module 22 is unlikely to be removed from the active list by the determination module 24. In short, by altering the rule for issuing a report on the event 1B by the determination module 24, the mobile communication device 200 is benefited from maintaining service resources of more base stations as much as possible.

It should be noted that, regardless of whether the number of active sets reaches an upper limit, it can be determined whether the report on the event 1B is to be issued according to the second customized threshold. For example, when the number of the active set base stations has not reached the upper limit, the determination module 24 may be designed to determine whether the report on the event 1B is to be issued according to the second customized threshold; and, when the number of the active set base stations has reached the upper limit, the determination module 24 may be designed to determine whether to issue a report on the event 1B according to the second standard threshold. Alternatively, according to concepts of the present invention, multiple different customized thresholds may be utilized based on a multi-phase design concept for issuing a report on the event 1B.

In the UTRAN specifications, an event 1C is an event in which, a quota of active set base stations is full, and the connection ability of a new base station originally, which is not included as an active set, becomes greater than the connection ability of an active set base station. A report of the event 1C is to request the UTRAN system administrator to replace the active set base station by the new base station. That is, a replacement is performed by removing the old active set base station and adding the new base station into the active set. According to the UTRAN specifications, when a quota of active set base stations is full, and a connection ability $M_{NEW}$ of a non-active set base station detected by a mobile communication device is greater than a sum (to be referred to as a third standard threshold) of a connection ability $M_{OLD}$ of a particular active set base station and a predetermined value $H_{1C}/2$, a report on the event 1C needs to be issued. The predetermined value $H_{1C}$ is provided by a UTRAN network end.

According to an embodiment of the present invention, the determination module 24 in the mobile communication device 200 evaluates whether the reporting module 26 needs to issue a report on the event 1C according to a third customized threshold different from the third standard threshold. That is to say, the determination module 24 is designed to, when the number of active set base stations has reached an upper limit and the connection ability of a non-active set base station is greater than a corresponding third customized threshold, determine that a report on the event 1C needs to be issued to request the system administrator to replace a base station, having the weakest connection ability in the active set, by the base station, outside the active set, that then becomes an active set base station.

For example, the third customized threshold may be designed as a constant value, e.g., −12 dB. In practice, the third customized threshold may be adjusted according to connection ability of all or part of the base station in the active set. For example, when one or more base stations in the active set list have poor connection ability, the determination module 24 lowers the third customized threshold, so as to allow the mobile communication device 200 to request for and thus obtain preferred service resources before UTRAN system's criteria decides so, when service quality of the active set base station is unsatisfactory.

In practice, without changing an equation stated in the UTRAN specifications for calculating the threshold of the event 1C, the mobile communication device 200 may replace a value originally provided by a UTRAN network end in the equation by a customized value, so as to generate the third customized threshold different from the third standard threshold. As previously described, the equation for calculating the third standard threshold $TH_{1C\_STANDARD}$ is $TH_{1C\_STANDARD} = M_{WORST} + H_{1C}/2$, where $M_{WORST}$ represents the signal strength of an active set base station having the weakest signal strength, and $H_{1C}$ represents a value provided by the UTRAN network end. The mobile communication device 200 may determine another value $H'_{1C}$ and substitute $H'_{1C}$ into the equation. The mobile communication device 200 can be configured to: 1) when the signal strength of the base station in the active list with the strongest connection ability ($M_{BEST}$) is smaller than −12 dB, render $H'_{1C} = [(−12) − (M_{BEST})]*2$, such that the third customized threshold changes with $M_{BEST}$; and 2) when $M_{BEST}$ is greater than −12 dB and $M_{WORST}$ is smaller than −12 dB, render $H'_{1C} = [(−12) − (M_{WORST})]*2$, such that the third customized threshold changes with $M_{WORST}$; and 3) when both $M_{BEST}$ and $M_{WORST}$ are greater than −12 dB, adopting the value $H_{1C}$ provided by the UTRAN network end to set the threshold of the event 1C as the third standard threshold.

When determining whether a report on the event 1C is to be issued, the determination module 24 may also consider the time as a determination basis. As regulated by a UTRAN system administrator, when the connection ability of a base station outside the active set is greater than the connection ability of an active set base station for longer than a standard period, a mobile communication device is required to issue the event 1C report. In one embodiment, the determination module 24 is designed to determine the report is to be issued when the connection ability of a base station outside the active set is greater than the connection ability of an active set base station for longer than a customized period which is shorter than the standard period. Similarly, the determination module 24 may selectively alter the rule for issuing the event 1C report so that it allows the mobile communication device 200 to more quickly acquire service resources favorable for current circumstances. In one embodiment, the above customized period may be adjustable, and the customized period may be shortened when one or more base stations in the active set list are determined as having poor connection ability. With the above approach, the mobile communication device 200 is allowed to request for and thus obtain preferred service resources before UTRAN system's criteria decides so when service quality of an active set base station is non-ideal.

In conclusion of processing methods employed by the determination module 24 regarding the events 1A, 1B and 1C, determination principles of the determination module may be summarized as below. First of all, before a quota of active set base stations becomes full, other base stations having preferred connection ability within a nearby region are added into the active set. Secondly, before the quota of active set base stations becomes full, base stations are not actively removed as much as possible. Thirdly, after the quota of active set base stations becomes full, it is determined within a shorter period to replace a weaker base station by a stronger base station. It should be noted that, the above determination principles may be independently executed (i.e., the determination module 24 may practice one or more of the above determination principles), and are respectively capable of reducing possibilities of call disconnections caused by insufficient communication resources.

Currently, many communication service providers provide mobile communication devices with connection services using multiple usable communication frequencies and multiple base stations of different communication systems. In an active set, all base stations usually correspond to a same communication frequency. Therefore, an overall or partial connection ability (e.g., the connection ability of the strongest among the current active set base stations) of active set base stations may be utilized as a basis for evaluating the connection quality of a communication frequency in use. In the UTRAN specifications, an event 2D represents an event in which connection quality of a communication frequency in use is lower than a standard threshold. A report of the event 2D is for requesting the UTRAN system administrator to grant an evaluation period for the evaluation module 22 to evaluate whether another communication frequency is preferred over the communication frequency currently in use or whether there is another better communication system available in the nearby region. After receiving the report on the event 2D, the system administrator sends a message of granting the evaluation period to the mobile communication device. In practice, the mobile communication device needs to issue the report on the event 2D when in need of performing a hard handover. After the evaluation, if the mobile communication device determines that a new communication frequency is better or a more ideal communication system is available, the mobile communication device may request the system administrator to switch to the new communication frequency from the communication frequency currently in use or to the new communication system. According to the UTRAN specifications, a mobile communication device is expected to issue a report on the event 2D when quality of a communication frequency in use is lower than a threshold (to be referred to as a fourth standard threshold) of the event 2D.

According to an embodiment of the present invention, the determination module 24 in the mobile communication device 200 may evaluate whether the reporting module 26 needs to issue a report on the event 2D according to a fourth customized threshold different from the fourth standard threshold specified in communication standard. In one embodiment, the fourth customized threshold is set to be greater than the fourth standard threshold, such that the reporting module 26 issues the report on the event 2D before the connection quality of the communication frequency drops to lower than the fourth standard threshold, so as to further allow the mobile communication device 200 to evaluate for a new communication frequency before the system decides so. Otherwise, it is possible that the mobile communication device 200 may later be totally deprived from a chance of switching to a new communication frequency or to another communication system if the connection quality of the communication frequency in use continuously degrades to a level that the mobile communication device 200 loses connection. The above issue may be prevented though replacing the fourth standard threshold by the higher fourth customized threshold.

In the UTRAN specifications, for a mobile communication device, an event 1E happens when a connection ability of an active set base station is greater than an absolute threshold $TH_{1E}$; and event 1F happens when a connection ability of an active set base station detected has dropped to lower than an absolute threshold $TH_{1F}$. If all active set base stations match the rule for expectedly issuing a report on the event 1F, it is without question that quality of a communication frequency in use is in a severely poor condition. In practice, in addition to the mobile communication device 200, the system administrator also has the list of active set base stations of the mobile communication device 200. When the system administrator figures out that the mobile communication device has issued a report on the event 1F for all corresponding active set base stations, the system administrator sends a message granting the aforementioned evaluation period to the mobile communication device. In practice, the system administrator only issues the message for granting the evaluation period after having collected the reports on the event 1F from all of the active set base stations of the mobile communication device 200. Nevertheless, the connection ability of each base station with the mobile communication device 200 usually fluctuates. More specifically, the connection ability of a particular base station may reduce to lower than the threshold $TH_{1E}$ but higher than the threshold $TH_{1F}$ within a short period, and then return to be higher than the threshold $TH_{1E}$. As such, reports on the event 1E, which may be repeatedly issued in certain short period of time, on top of being redundant in helping the system administrator to determine whether to grant the evaluation period, also causes wastes of system resources as well as in operation time.

To solve the above issue, in one embodiment of the present application provides a configuration that, after issuing a report on the event 1E/1F for a particular base station, the reporting module 26 does not issue a report on a same subsequent event 1E/1F of the base station if the determination module 24 again determines that a report on the same 1E/1F event of the base station needs to be issued (i.e., ignoring the determination result of the determination module 24). For example, after the reporting module 26 issues a report on the event 1E of a base station, if the connection ability of the base station drops to lower than the threshold $TH_{1E}$ but higher than the threshold $TH_{1F}$ and then rises to be higher than the threshold $TH_{1E}$ in a way that the determination module 24 determines that a report on the event 1E of the base station needs to be again issued, the reporting module 26 omits such following determination result; that is, the reporting module 26 does not issue a report on the event 1E twice in a roll. In another feasible approach, only when an interval between two consecutive determination results of the determination module 26 exceeds a predetermined time length, the reporting module 26 issues a report on the event 1E for a second time to the system administrator. Similarly, after the reporting module 26 issues a report on the event 1F of a base station, if the connection ability of the base station drops to lower than the threshold $TH_{1E}$ but higher than the threshold $TH_{1F}$ and then rises to be higher than the threshold $TH_{1E}$ in a way that the determination module 24 determines that a report on the event 1F of the base station needs to be again issued, the reporting module 26 omits such determination result; that is, the reporting module 26 does not repeatedly issue a report on the event 1F.

In one embodiment, the reporting module 26 comprises a control unit (not shown) for adjusting a length of the report according to quality of a frequency in use. For example, if an output of the evaluation module 22 indicates poor quality in a frequency in use, the control unit may appropriately delete certain unnecessary contents from the report to reduce an overall size of the report. The probability of erroneous packets or lost packets gets higher as the frequency quality becomes poorer. Some system administrators may request a mobile communication device to retransmit an entire report when the number of erroneous packets reaches a predetermined value. By controlling the length of the report with the control unit, the possibility of retransmitting the report may be reduced to further seek for required communication resources for the mobile communication device 200 as quickly as possible.

In one embodiment, the reporting module 26 initiatively provides reference information, not requested by the wireless communication network, in the report. For example, a UTRAN system administrator usually does not request a mobile communication device to include reference time information of base stations in the report. However, if the mobile communication device 200 determines that the reference information may assist the system administrator in more correctly allotting communication resources, the mobile communication device 200 may instruct the reporting module 26 to initiatively add the reference time information into a report to be transmitted to the system administrator.

Figure 3:
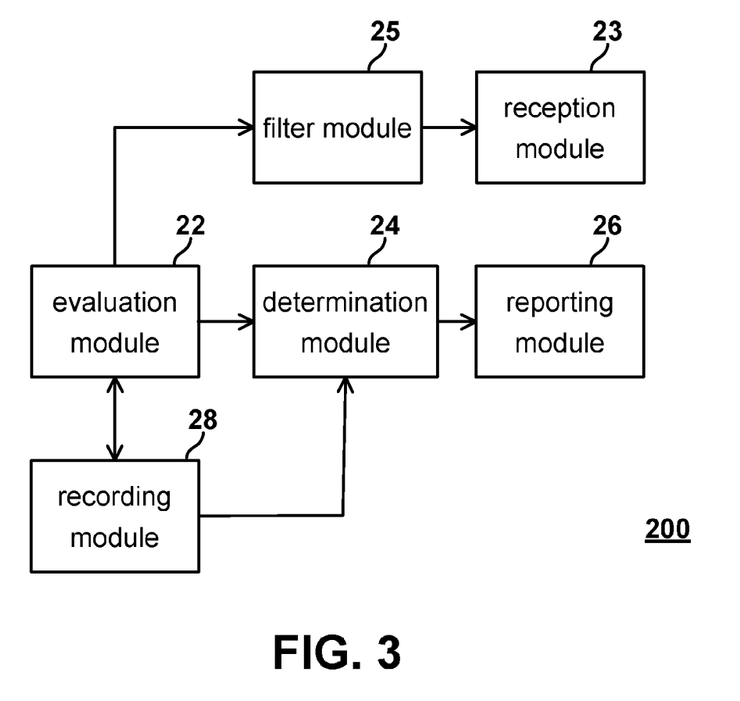
FIG. 3 shows a mobile communication device further comprising a filter module according to an embodiment of the present invention.

In one embodiment of the present invention, as shown in FIG. 3, the mobile communication system 200 further comprises a reception module 23 and a filter module 25. The reception module 23 receives a base station switch instruction, a frequency switch instruction or a communication system switch instruction that the wireless communication network sends to the mobile communication device 200. The filter module 25 selectively declines the base station switch instruction, the frequency switch instruction or the communication system switch instruction. For example, in response to a report on the event 1C, a system administrator instructs the mobile communication device 200 to replace an active set base station by a new base station. After issuing the report on the event 1C, if an output of the evaluation module 22 indicates that the connection ability of the new base station has severely dropped to a level that the new base station no longer qualifies as an active set base station, the filter module 25 may selectively decline the base station switch instruction, and so the system administrator does not perform subsequent resource allotment adjustments.

For another example, in response to a report of the event 2D, a system administrator may instruct the mobile communication device 200 to switch from a communication frequency in use to a new communication frequency. After issuing the report on the event 2D, if an output of the evaluation module 22 indicates that the quality of the communication frequency in use has restored to a satisfactory level, the filter module 25 may selectively decline the frequency switch instruction. For another example, in response to a report of the event 2D, assume that a system administrator instructs the mobile communication device 200 to switch from a communication system in use to another communication system.

After issuing the report on the event 2D, if an output of the evaluation module 22 indicates that the quality of the communication system in use has restored to a satisfactory level, the filter module 25 may selectively decline the communication system switch instruction.

In the embodiment in FIG. 3, the filter module 25 is designed to determine whether to accept or decline the base station switch instruction according to the connection ability (may be regarded as a quality index of an active set base station of the mobile communication device 200) determined by the evaluation module 22. In practice, for example, the reception module 23, the evaluation module 22 and the reporting module 26 may also be integrated into a transceiver circuit in the mobile communication device 200 in order to share hardware resources.

In practice, a UTRAN system administrator is authorized to determine which base stations may be included in an active set list or a monitor set list of a mobile communication device. In short, a base station needs to be included in a predetermined base station set as regulated by a UTRAN system administrator, so as to allow the mobile communication device to utilize communication resources of the base station. Assuming that a mobile communication device has detected a base station that is not included in the predetermined base station set, the mobile communication device has no access to utilize the communication resources of the base station even if the base station has an extremely good connection ability. According to an embodiment of the present invention, regardless of whether a base station is included in the predetermined base station set, the determination module 24 is design to report a connection ability evaluation result generated by the base station to a UTRAN system administrator. A main benefit of the above approach is that, if no other communication resources are available in a nearby region of the mobile communication device 200 apart from the base station, the UTRAN system administrator may consider allotting the resource access authority of the base station to the mobile communication device 200.

Figure 4:
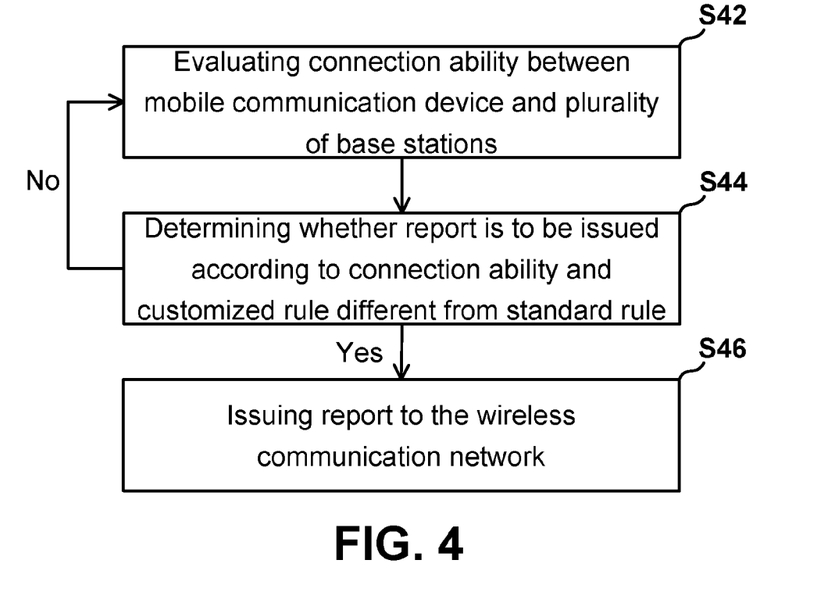
FIG. 4 shows a flowchart of a control method for a mobile communication device according to an embodiment of the present invention.

According to another embodiment of the present invention, a control method for a mobile communication device is provided. The mobile communication device is serviced by a wireless communication network. Referring to FIG. 4 showing a flowchart of the control method, the control method comprises the following steps. In step S42, a connection ability between the mobile communication device and a plurality of base stations is evaluated. In step S44, whether to issue a report according to the connection ability and a customized rule different from a standard rule is determined. The standard rule corresponds to a threshold of the connection ability defined by the wireless communication network. When a determination result of step S44 is yes, the report is issued to the wireless communication network. When the determination result of step S44 is no, step S42 or step S44 is iterated.

Various operation details (e.g., processing methods for the different types of events) in the descriptions associated with the mobile communication device 200 are applicable to the control method in FIG. 4, and shall be omitted herein.

With the above embodiments, a mobile communication device and an associated control method are provided. By determining a time point for requesting a wireless communication network for resource access rights according to a customized rule instead of a standard rule regulated by wireless communication network specifications, the mobile communication device of the present invention is capable of significantly reducing possibilities of call disconnections caused by insufficient communication resources. It should be noted that, in addition to a mobile communication device compliant to UTRAN specifications, the concepts of the present invention are suitable for various kinds of mobile communication devices that need to request a wireless communication network for resource access rights through sending reports.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile communication device, serviced by a wireless communication network, comprising:
    an evaluation module, configured to evaluate a connection ability between the mobile communication device and a plurality of base stations;
    a determination module, configured to determine whether a report is to be issued according to the connection ability and a customized rule different from a standard rule, wherein the standard rule corresponds to a threshold of the connection ability defined by the wireless communication network;
    a reporting module, that issues the report to the wireless communication network when the determination module determines to issue the report; and
    a recording module, recorded with an active set list;
    wherein, when a quantity of base stations in the active set list has not reached an upper limit and a target base station from the base stations is not included in the active set list, the determination module determines whether the report is to be issued according to the connection ability of the target base station, in order to request the wireless communication network to add the target base station into the active set list; and
    while the standard rule comprises a standard period, the customized rule comprises a customized period shorter than the standard period; the wireless communication network has a default that the mobile communication device issues the report when the connection ability of the target base station remains greater than a first threshold for longer than the standard period, while the determination module determines the report is to be issued when the connection ability of the target base station remains greater than the first threshold for longer than the customized period.

2. The mobile communication device according to claim 1, wherein
    the standard rule comprises a first standard threshold, and the customized rule comprises a first customized threshold lower than the first standard threshold; the wireless communication network has a default that the mobile communication device issues the report when the connection ability of the target base station is greater than the first standard threshold, while the determination module determines the report is to be issued when the connection ability of the target base station is greater than the first customized threshold.

3. The mobile communication device according to claim 1, wherein, when a target base station from the base stations is included in the active set list, the determination module determines whether the report is to be issued according to the connection ability of the target base station, in order to request the wireless communication network to remove the target base station from the active set list; and while the standard rule comprises a second standard threshold, the customized rule comprises a second customized threshold lower than the second standard threshold; the wireless communication network has a default that the mobile communication device issues the report when the connection ability of the target base station is lower than the second standard threshold; the determination module determines the report is to be issued when the connection ability of the target base station is lower than the second customized threshold.

4. The mobile communication device according to claim 3, wherein when a number of a base station in the active set list has not reached an upper limit, the reporting module does not issue the report.

5. The mobile communication device according to claim 1, further comprising:
wherein, when a number of a base station in the active set list has reached an upper limit and a target base station from the base stations is not included in the active set list, the determination module determines whether the report is to be issued according to the connection ability of the target base station to request the wireless communication network to replace an original base station in the active set list by the target base station;
while the standard rule comprises a third standard threshold, the customized rule comprises a third customized threshold lower than the third standard threshold; the wireless communication network has a default that the mobile communication device issues the report when the connection ability of the target base station is greater than the third standard threshold;
the determination module determines the report is to be issued when the connection ability of the target base station is greater than the third customized threshold.

6. The mobile communication device according to claim 5, wherein the third customized threshold is adjustable; when it is determined that the connection ability of at least one base station in the active set list is poor, the determination module lowers the third customized threshold.

7. The mobile communication device according to claim 1, further comprising:
wherein, when a quantity of base stations in the active set list has reached an upper limit and a target base station from the base stations is not included in the active set list, the determination module determines whether the report is to be issued according to the connection ability of the target base station to request the wireless communication network to replace an original base station in the active set list by the target base station;
while the standard rule comprises a standard period, the customized rule comprises a customized period shorter than the standard period; the wireless communication network has a default that the mobile communication device issues the report when the connection ability of the target base station remains greater than a third standard threshold for longer than the standard period, while the determination module determines the report is to be issued when the connection ability of the target base station remains greater than the third customized threshold for longer than the customized period.

8. The mobile communication device according to claim 7, wherein the customized period is adjustable; when it is determined that the connection ability of at least one base station included in the active set list is poor, the determination module shortens the customized period.

9. The mobile communication device according to claim 1, wherein the determination module determines quality of a frequency in use according to the connection abilities of the base stations, and determines whether the report is to be issued according to the quality of the frequency in use to request the wireless communication network to allow an evaluation period for the evaluation module to evaluate a new frequency; while the standard rule comprises a fourth standard threshold, and the customized rule comprises a fourth customized threshold higher than the fourth standard threshold; while the wireless communication network has a default that the mobile communication device issues the report when the quality of the frequency in use is lower than the fourth standard threshold, the determination module determines the report is to be issued when the quality of the frequency in use is lower than the fourth customized threshold.

10. The mobile communication device according to claim 1, wherein the reporting module comprises a control unit for adjusting a length of the report according to quality of a frequency in use.

11. The mobile communication device according to claim 1, wherein the reporting module initiatively provides, in the report, reference information that is unrequested by the wireless communication network.

12. The mobile communication device according to claim 1, further comprising:
wherein, a target base station from the base stations is included in the active set list, and while the wireless communication network has a default that the mobile communication device issues the report when a corresponding relationship between the connection ability of the target base station and an absolute threshold changes, the reporting module selectively ignores the change and does not issue the report.

13. The mobile communication device according to claim 1, further comprising:
a reception module, that receives a base station switch instruction, a frequency switch instruction or a communication system switch instruction sent by the wireless communication network to the mobile communication device; and
a filter module, that selectively declines the base station switch instruction, the frequency switch instruction or the communication system switch instruction.

14. The mobile communication device according to claim 13, wherein the filter module determines whether to accept or decline the base station switch instruction, the frequency switch instruction or the communication system switch instruction according to the connection abilities of the base stations.

15. The mobile communication device according to claim 1, wherein while the wireless communication network has a default that the report is corresponding to a target base station included in a predetermined base station group, the customized rule allows the target base station to be excluded from the predetermined base station group.

16. A control method for a mobile communication device serviced by a wireless communication network, comprising:
a) evaluating a connection ability between the mobile communication device and a plurality of base stations;
b) determining whether a report is to be issued according to the connection ability and a customized rule different from a standard rule, wherein the standard rule corresponds to a threshold of the connection ability defined by the wireless communication network; and
c) issuing the report to the wireless communication network when step (b) determines so, wherein the mobile communication device is recorded with an active set list; step (b) comprises:

when quantity of a base station in the active set list has not reached an upper limit and a target base station from the base stations is not included in the active set list, determining whether the report is to be issued according to the connection ability of the target base station to request the wireless communication network to add the target base station into the active set list; and determining the report is to be issued when the connection ability of the target base station is greater than the first threshold for longer than a customized period, while the standard rule comprises a standard period, the customized rule comprises the customized period shorter than the standard period; whereas the wireless communication network has a default that the mobile communication device issues the report when the connection ability of the target base station is maintained greater than a first threshold for longer than the standard period.

17. The control method according to claim 16, wherein the standard rule comprises a first standard threshold, and the customized rule comprises a first customized threshold lower than the first standard threshold; the wireless communication network has a default that the mobile communication device issues the report when the connection ability of the target base station is greater than the first standard threshold; step (b) further comprises determining the report is to be issued when the connection ability of the target base station is greater than the first customized threshold.

18. The control method according to claim 16, wherein step (b) comprises:

when a target base station from the base stations is included in the active set list, determining whether the report is to be issued according to the connection ability of the target base station to request the wireless communication network to remove the target base station from the active set list; and determining the report is to be issued when the connection ability of the target base station is smaller than a second customized threshold, while the standard rule comprises a second standard threshold, the customized rule comprises the second customized threshold lower than the first standard threshold; whereas the wireless communication network has a default that the mobile communication device issues the report when the connection ability of the target base station is lower than the second standard threshold.

* * * * *